US012775292B2

(12) United States Patent
Woodis

(10) Patent No.: US 12,775,292 B2
(45) Date of Patent: Oct. 27, 2026

(54) SOLAR POWERED AIR REGULATED CONTROLLER

(71) Applicant: FTW Technologies, LLC, Austin, TX (US)

(72) Inventor: Mark Andrew Woodis, Cordell, OK (US)

(73) Assignee: FTW Technologies, LLC, Austin, TX (US)

( * ) Notice: Subject to any disclaimer, the term of this patent is extended or adjusted under 35 U.S.C. 154(b) by 0 days.

(21) Appl. No.: 18/386,933

(22) Filed: Nov. 3, 2023

(65) Prior Publication Data

US 2024/0151251 A1 May 9, 2024

Related U.S. Application Data

(60) Provisional application No. 63/546,068, filed on Oct. 27, 2023, provisional application No. 63/541,787, filed on Sep. 30, 2023, provisional application No. 63/464,080, filed on May 4, 2023, provisional application No. 63/382,788, filed on Nov. 8, 2022.

(51) Int. Cl.
*G05D 9/02* (2006.01)
*F16K 31/18* (2006.01)
*F17C 7/00* (2006.01)

(52) U.S. Cl.
CPC ............... *G05D 9/02* (2013.01); *F16K 31/18* (2013.01); *F17C 7/00* (2013.01)

(58) Field of Classification Search
CPC .. G05D 9/02; G05D 9/04; F16K 21/18; F16K 21/185; F16K 21/20; F16K 31/34; F16K 31/18; F16K 31/185; F16K 31/20; F15B 11/0725; F15B 2211/8855; F17C 17/00
See application file for complete search history.

(56) References Cited

U.S. PATENT DOCUMENTS 2,708,849 A * 5/1955 Steenbergh ............. F16K 31/34 251/75
2,944,562 A * 7/1960 Glasgow .................. G05D 9/04 251/75
2,966,172 A * 12/1960 Smith ........................ G01F 3/38 73/224
3,255,922 A * 6/1966 Socol ........................ G01F 1/00 137/429
4,390,037 A * 6/1983 Perkins .................... G05D 9/04 137/59
4,505,288 A * 3/1985 Murphy, Jr. ............. G05D 9/02 137/101.25
5,158,111 A * 10/1992 Lambert ................ G05D 16/16 137/627.5
2022/0403944 A1* 12/2022 Neeb ....................... F16K 21/18

* cited by examiner

*Primary Examiner* — Hailey K. Do
(74) *Attorney, Agent, or Firm* — Braxton IP PLLC; Bobby W. Braxton

(57) ABSTRACT

A system for an air regulated controller. In one embodiment, a solar powered air regulated controller is disclosed. This allows the tanks to be pneumatically controlled via air rather than wet gas. The result is significant emissions reduction. Additionally, as less wet gas is used for venting, more is directed to the downstream sales line.

6 Claims, 6 Drawing Sheets

SOLAR POWERED AIR REGULATED CONTROLLER

The present invention claims priority to U.S. Provisional Application No. 63/546,068 filed Oct. 27, 2023, U.S. Provisional Application No. 63/541,787 filed Sep. 30, 2023, U.S. Provisional Application No. 63/464,080 filed May 4, 2023, and U.S. Provisional Application No. 63/382,788 filed Nov. 8, 2022, the entirety of all of which are hereby incorporated by reference.

BACKGROUND OF THE INVENTION

Technical Field

Description of Related Art

Natural gas supplied controls often need to be vented. When natural gas supplied controls are actuated, they must also be vented. Often, they are supplied pressure to open and the internal contents are burped or expelled to reduce pressure and close. If the supply pressure is comprised of hydrocarbons, those hydrocarbons are expelled. This results in undesirably increased emissions. Consequently, there is a need for a new method of supplying and venting of natural gas pneumatic controls.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
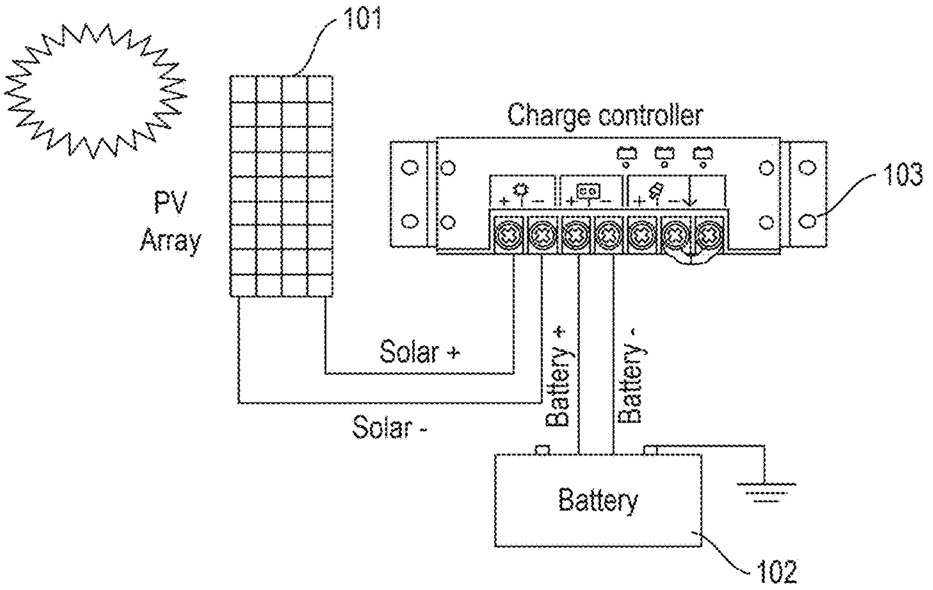
FIG. 1 is a schematic of a solar system in one embodiment.

FIG. 1 is a schematic of a solar powered system in one embodiment. It should be noted that the air regulated controller, in some embodiments, is referred to as a solar powered air regulated controller. This is for illustrative purposes only and should not be deemed limiting. While solar power has many benefits, as described below, the means of providing power to the system can comprise virtually any power source including, but not limited to the existing power grid, batteries, wind power, etc. Thus, while a solar powered embodiment is discussed, this should not be deemed limiting.

As noted, the solar powered system in FIG. 1 provides a means of providing power to the system via solar power. This is beneficial, in some embodiments, for a variety of reasons. First, often the systems are placed in remote locations where power is not readily available to the tanks. Solar systems allow a method to delivery power to remote locations.

Second, solar powered systems are often more environmentally friendly. This is a benefit as many of the benefits discussed herein are likewise environmentally beneficial.

As shown the system has an array 101. Virtually any type of arrays 101 can be utilized. The arrays 101 are coupled to the charge controller 103 which ensures the battery 102 is properly charged. Virtually any type of battery 102 or charge controller 103 can be used. While one battery 102 is shown, in other embodiments one or more batteries can be used. In one embodiment the battery 102 comprises an OGRE 12 Volt AGM battery. This is for illustrative purposes and should not be deemed limiting.

As noted, the controller 103 can comprise any controller 103 known in the art. In one embodiment the controller 103 comprises a Specialty Concepts ASC 12 Volt controller. This is for illustrative purposes and should not be deemed limiting.

As noted, the array 101 can comprise virtually any type of array. In one embodiment, the array comprises a Rich Solar RS-M150, 150 Watt 12 Volt monocrystalline panel and brackets. This is for illustrative purposes and should not be deemed limiting.

Figure 2:
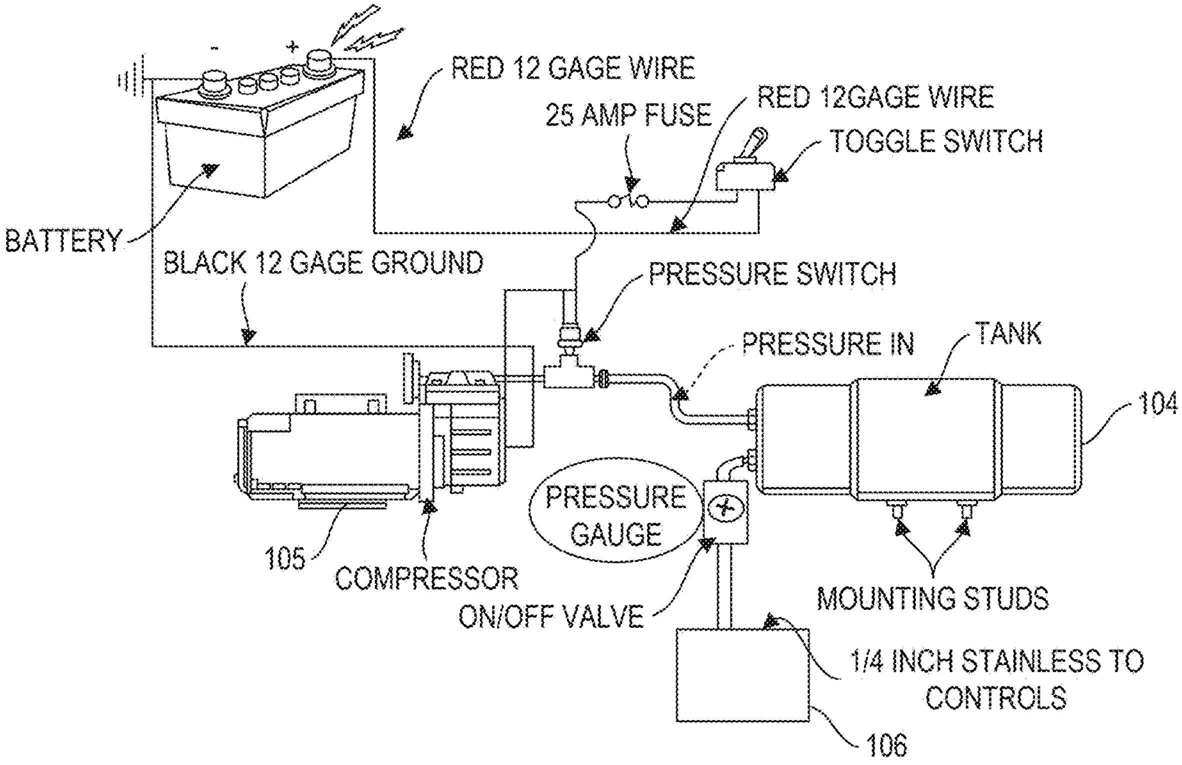
FIG. 2 is a perspective view of the air regulated controller in one embodiment.

FIG. 2 is a perspective view of the air regulated controller in one embodiment. As shown the battery is coupled to a compressor 105. Virtually any type of air compressor can be used. In one embodiment the air compressor 105 comprises a VIAIR 2 gallon 150 psi air tank/compressor. The size and pressure capacity of the compressor 105 will vary depending upon the size and pressure of the tank 104.

Also shown is the storage tank 104. Virtually any type of tank 104 can be utilized. The contents of the tank 104 will vary depending upon the specific application. The size, capacity, etc. of the storage tank 104 can be adapted depending upon application. The storage tank 104 stores air from the compressor 105. The storage tank 104 allows for a build-up of air such that the compressor 105 need not run continuously.

Coupled to, and downstream of the storage tank 104 is a pneumatic system 106. The pneumatic system 106 can be used for a variety of purposes including venting, opening and closing valves, turning on equipment, etc. The pneumatic system 106 can be coupled to various vessels 120 (not shown in FIG. 2). The vessel 120 can comprise virtually any production equipment such as storage tanks, process tanks, fluid separators, etc. Virtually any vessel 120 which has pneumatic controls can be utilized. As noted, a pneumatic system 106 can be used, as an example, to open and close valves on the vessel 120. When that is accomplished, pressure within the pneumatic system 106 causes the valves to open or shut. Moving these valves, in some embodiments, requires pressure. Once the valve is opened or closed, the pressure within the pneumatic system 106 must be relieved, or burped.

As can be seen, when needed, the pneumatic system's 106 and operate on and have the pressure relieved using pure air rather than process gasses (such as natural gas and entrained liquids). When necessary to refill the storage tank 104, the battery 102 instructs the air compressor 105 to engage. This causes the air compressor 105 to apply air to the storage tank 104.

The headspace from the vessel 120 often includes the contents from the vessel 120. If the vessel 120 housed methane, for example, methane gas, carbon dioxide, and other gasses can be found in the vessel 120 or the headspace of the vessel 120. These pressurized gasses are referred to herein as produced wet gas. If the pneumatic control system 106 is controlled by these wet gasses (pressurized gasses), for example, then when the pneumatic control system 106 releases pressure, it is releasing the wet gasses. These gases are emitted into the atmosphere causing an increase in emissions. This is undesirable for a variety of reasons. By venting using air, rather than headspace, the emissions are reduced or eliminated. The term pressurized gasses includes gasses as well as entrained fluids within the gasses.

Figure 3A:
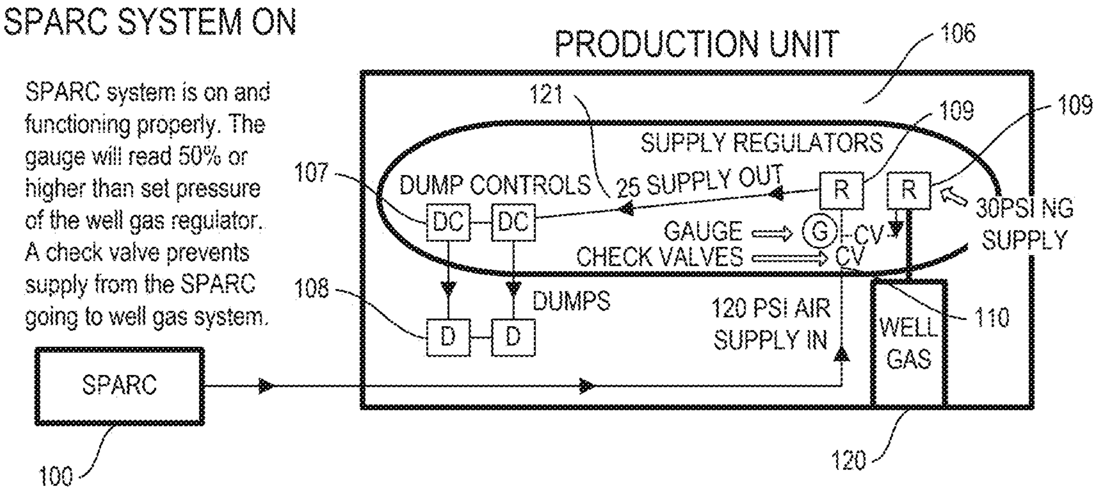
FIG. 3*a* is a schematic of the air regulated controller system turned on in one embodiment.

FIG. 3A is a schematic of the air regulated controller system in one embodiment. As noted, while the system is referred to as "SPARC", or "Solar Powered Air Regulated Controller", the system can be powered from any source.

As shown, the SPARC system 100 is coupled to a pneumatic system 106. In FIG. 3A, the pneumatic system 106 is controlled and powered by the SPARC system 100. Thus, pneumatic system 106 is powered by air within the SPARC system, in one embodiment. Thus, rather than being powered by the pressure available from the vessel 120, such as natural gas, the pneumatic system is powered by air. As noted, when the pneumatic system 106 needs to relieve pressure, the relieved pressure is air rather than releasing natural gas, as an example. As will be discussed in more detail, in some embodiments the pneumatic system is switchable to operate from air from the tank 104 or pressurized gas from the vessel 120.

The pneumatic system, in one embodiment, is used to control process operations on a vessel. These process operations can include any process which is typically monitored or controlled by a pneumatic system. One embodiment will be discussed wherein the pneumatic controls operate dump controls. This is for illustrative purposes only, however, and should not be deemed limiting.

As shown the pneumatic system 106 comprises dump controls 107 and dumps 108. In the embodiment depicted, the vessel 120 collects water and oil, each of which must be occasionally dumped to reduce a fluid level. In the embodiment depicted, the SPARC system operates to control the dump controls 107 and the dumps 108. These dumps 108 can comprise any subsequent location to house or remove liquid previously stored in the vessel 120. The dumps 108, for example, can comprise another storage vessel. The dumps 108, in one embodiment, assist by partially emptying the vessel 120 to a desired fluid level. When the desired fluid level is reached, the dump controls 107 are closed again and the vessel 120 can continue to collect fluid. In the embodiment depicted, the dumps controls 107 and the dumps 108 operate from air from the SPARC as opposed to wet gas.

The dump controls 107 can comprise a valve, such as a gate valve, which only opens upon exceeding a specified amount of pressure. In one embodiment the dump controls 107 comprises a pneumatic valve which can be controlled via pressure. Thus, when a specific condition is met, such as pressure of the pneumatic system 106, pressure of the vessel 120, fluid level of a vessel 120, etc., the dump controls 107 can open to relieve or burp the built-up pressure of the pneumatic system 106 as well as partially empty the vessel 120. In one embodiment, for example, the dump control 107 comprises a 25 pound spring which holds the dump gate valve closed. When greater than 25 pounds of pressure is supplied to the dump controls 107, then the dumps controls 107 can open. This simultaneously partially lowers the level of the vessel 120 as well as relieving the pressure by venting the gas. When the SPARC system is operational, the dump controls 107 are operating and releasing air which can be relieved to the atmosphere. In other embodiments, however, the dump controls 107 are in fluid connection with a flare, incinerator, or other equipment which destroys the vented gas from the dump controls 107.

In operation, when a vessel 120 needs to be controlled, such as a valve being opened, the pneumatic system 106 supplies pressure to open the valve. Once opened, however, the pressure within the pneumatic system 106 needs to be relieved. The gas used to open the valve on the vessel 120 is relieved via a switch or equivalent.

The pneumatic system 106, as shown, also comprises a supply regulator 109, and a tank regulator 115. The tank regulator 115 drops the pressure of the headspace to a desirable operating pressure. In one embodiment the tank regulator 115 drops the pressure to about 75 psi. In some embodiments the system further includes a supply regulator 109 which can further reduce the pressure to a reduced operating pressure. In one embodiment the supply regulator 109 has a pressure of about 25 psi. The specific operating pressure will be dependent upon the pressure of the vessel 120, the pressure and desired pressure of the pneumatic system 106, etc.

As depicted, the pneumatic system 106 also comprises a check valve 110. This ensures that natural gas will not undesirably enter the SPARC system 100. As will be shown below, in some embodiments, the SPARC system 100 can operate on either air or the headspace of the vessel 120. The check valve 110 ensures that wet gas from the vessel 120 cannot enter the SPARC system. Getting wet gas in the SPARC system can plug or damage the SPARC system.

As shown in FIG. 3A, the pneumatic control system 106 is powered by air from the SPARC system 100. Rather than dumping or relieving pressure from natural gas, air is utilized in the pneumatic control system 106. This allows the benefits discussed herein to be achieved. The air supplied to the pneumatic system 106 in the SPARC system can comprise traditional untreated air which is collected by the compressor. Because untreated air is used and released by the SPARC system, there is no specific need for pure oxygen, nitrogen, etc. However, the SPARC system can use any type of gasses including air, oxygen, nitrogen, etc.

Figure 3B:
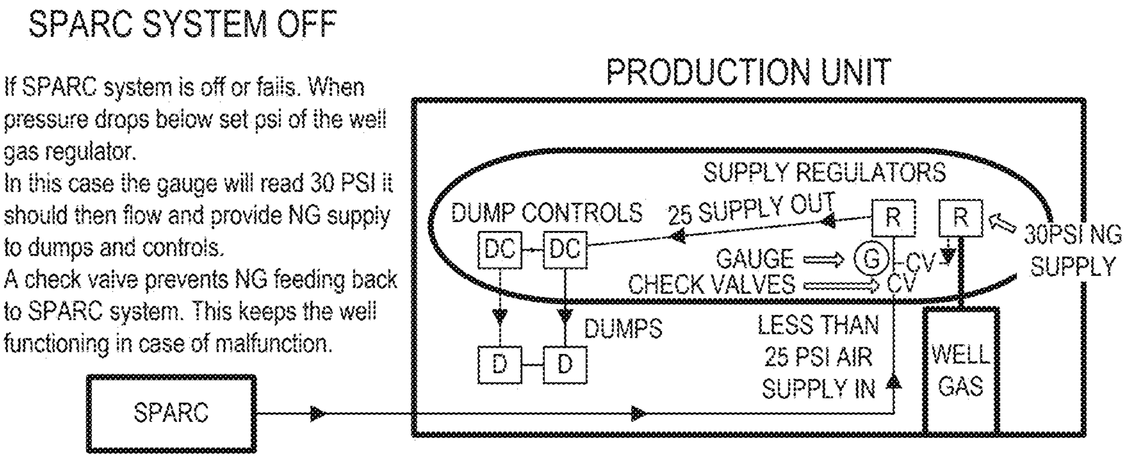
FIG. 3*b* is a schematic of the air regulated controller system turned off in one embodiment.

As noted, in one embodiment, and as depicted, the pneumatic system 106 can be powered by either the SPARC system 100, or the pressure associated with the vessel 120. This allows flexibility in the system. If, for example, the SPARC system 100 malfunctions or is down, the pneumatic system 106 would then switch and be powered by the pressure associated with the vessel 120. If the vessel 120 has natural gas, as an example, the pneumatic system 106 would then function and operate on natural gas. FIG. 3B shows a figure wherein the SPARC system is down. The SPARC system can be down for a variety of reasons. This includes malfunction of some of the SPARC components, insufficient solar energy, maintenance, etc. In such a situation, rather than allowing the entire system to be down, the pneumatic system 106 switches to operating on gas from the vessel 120. The vessel 120 can still be controlled, such as opening and closing valves, etc. Without a backup operating pressure source, the entire pneumatic system 106 would not function at all. However, with a backup operating pressure source, i.e., the vessel 120 pressure, the pneumatic system 106 can continue to function and operate as previously. When the SPARC system goes back online, the system can switch to using the SPARC system and air for the pneumatic source.

As can be seen in FIG. 3B, the dump controls 107 and the dumps 108 are powered by the natural gas from vessel 120. Due to the check valve 110, the SPARC system 100 is kept isolated and separated from the natural gas.

As noted, in one embodiment, because the system vents using air as opposed to the produced wet gas, or the headspace, emissions are eliminated. This results in decreased emissions, which is environmentally beneficial. However, it is also economically beneficial as this results in more gas downstream in the sales line which can be sold. Thus, rather than using some of the produced wet gas for venting, which results in waste and unwanted emissions, this product is conserved and subsequently sold.

Figure 4:
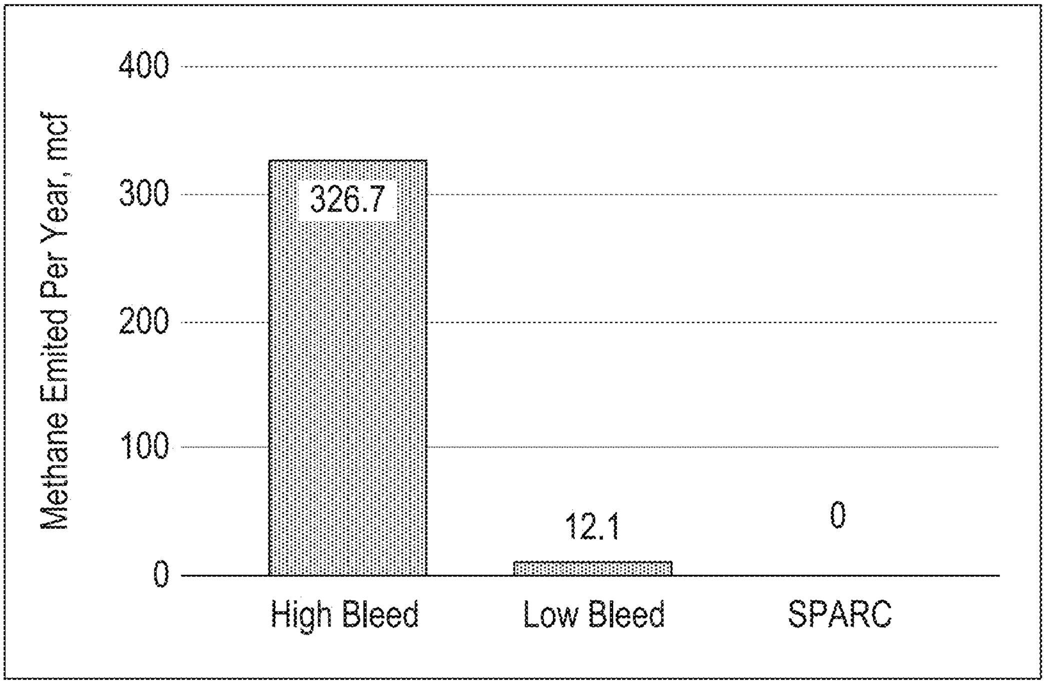
FIG. 4 is a chart of methane emissions across various systems.

Turning to FIG. 4, FIG. 4 is a chart of methane emissions across various systems. As can be seen the prior art consisted of a high bleed approach which resulted in high amounts of methane being released. A high bleed, or constant bleed approach, allows the system to continuously bleed pressure of the pneumatic system 106. The dump controls 107 are constantly being fed a portion of the wet gas through the pneumatic system 106. The high bleed graph represents an embodiment wherein the wet gas, specifically methane, is used in the pneumatic system. The high bleed, continuous bleed approach, resulted in approximately 326.7 mcf of methane being released due to bleeding on a specific pneumatic system. If the high bleed approach were to be replaced with a low bleed system, such as a mizer, this amount is reduced to 12.1. This is assuming similar operating conditions compared to the high bleed process. In the low bleed system, often referred to as an intermittent system, a mizer, for example, relieves pressure only when needed. However, the wet gas is used for pneumatic controls, and therefore, wet gas is released. While the low bleed results in less methane emitted compared to the high bleed, this is still a comparatively greater amount of methane which is released. As noted, this methane is either released to the atmosphere or it is burned or incinerated with a flare or similar. This too, however, is not ideal for a variety of environmental reasons. As can be seen, however, using the SPARC system, on the same pneumatic system under same conditions, there is no methane released. As noted, this is considerable reduction in emissions. Furthermore, this is product is now sold as opposed to being wasted.

Figure 5:
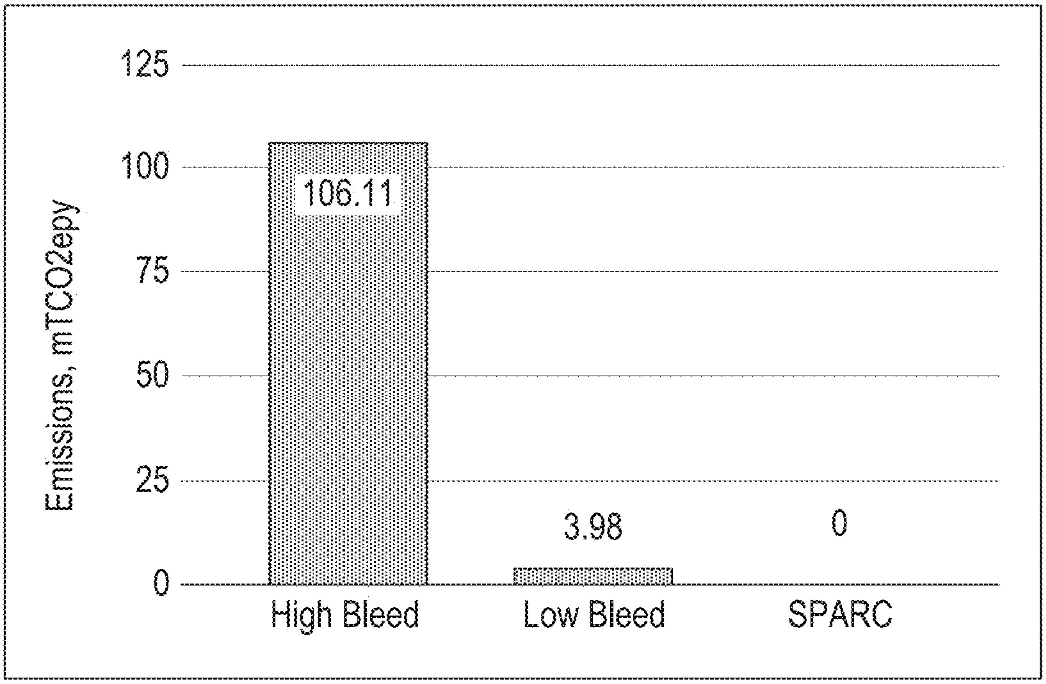
FIG. 5 is a chart of Carbon Dioxide emissions across various systems.

Similarly, FIG. 5 is a chart of Carbon Dioxide emissions across various systems. As can be seen the prior art consisted of a high bleed approach which resulted in high amounts of carbon dioxide being released. In such scenarios approximately 106.11 mcf of carbon dioxide was released due to bleeding on a specific tank. If a low bleed approach were utilized, this amount is reduced to 3.98. However, with the system and method discussed herein, there is no carbon dioxide released. As noted, this is considerable reduction in emissions.

There are considerable environmental benefits and impacts when using air for pneumatic controls as opposed to wet gas. Less wet gas is released. Further, less emissions result. Aside from environmental benefits, there are also economic benefits. This wet gas which was previously released, is now captured and sold. A waste stream is eliminated.

When scaled, these measures result in a significant reduction of emissions. Assuming 200 devices, this results in 20,000 mTCO2epy. This is the amount of carbon dioxide which is no longer emitted. As noted, aside from reduced emissions, the ability to capture more methane results in significant increases in revenue.

Figure 6:
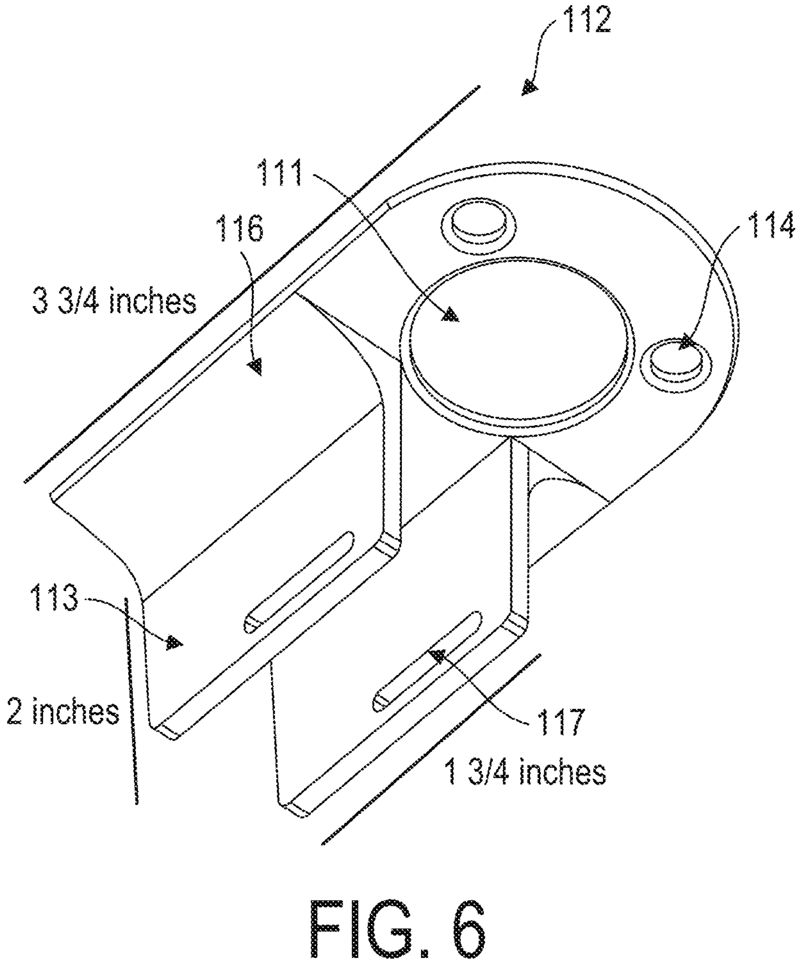
FIG. 6 is a perspective view of a mount in one embodiment.
Figure 7:
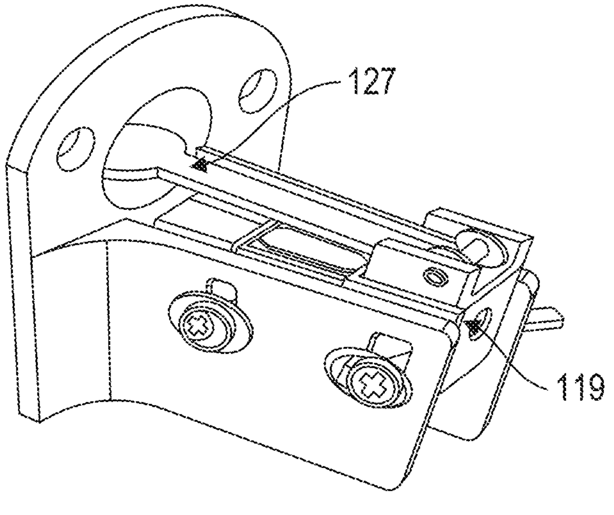
FIG. 7 is a perspective view of a valve with a mount in one embodiment.

Turning now to FIGS. 6 and 7, FIG. 6 is a perspective view of a mount in one embodiment. FIG. 7 is a perspective view of a valve with a mount in one embodiment.

As noted above, venting pneumatic systems can result in gas, wet gas, and other components being released to the atmosphere. As shown above, a high bleed system results in more gas being released than a low bleed system. While low bleed systems, such as low bleed mizers are available, they are often prohibitively expensive. Thus, there is a need to replace a high bleed system with a cost-effective low bleed system. The valve discussed herein can comprise virtually any valve in the art. It can include low bleed or constant bleed mizers, control valves, etc. In one embodiment, however, the valve comprises a three-way valve which allows venting to the atmosphere, but also venting to a burner, flare, etc. Thus, rather than releasing gas directly to the atmosphere, this vented gas can be routed to a burner or an incinerator. In many embodiments it is preferable to incinerate or burn a gas rather than vent it straight to the atmosphere. There are many benefits from this including positive environmental impact, reduced odor, etc. Further, often the burner or flare is used for other purposes such as to heat a stream. Therefore, the energy in the vent gas is captured as opposed to simply being released to the atmosphere.

The system discussed herein can be added where traditional mizers have been previously utilized. However, rather than requiring a $500 mizer valve, the system allows for the utilization of a traditional pneumatic valve or switch which can cost about $100. Thus, this system results in considerable cost savings.

Placing the valving or switch system, in some embodiments, is difficult as there is not a ready location to store and house the valve. Consequently, in one embodiment a mount 112 is disclosed. As shown in FIGS. 6 and 7, the mount 112 can comprise a unique shape to house and hold the valve or switch 119. As shown, a switch 119 is utilized. The switch 119, depending upon the configuration of a switch 119, connects one or more paths with various outcomes. As will be described, in one embodiment the switch 119 comprises a pneumatic switch with at least one supply line and two differing outputs. This will be discussed in more detail below.

As shown, the mount 112 has a plurality of mounting holes 114. The mounting holes 114 can be used to couple the mount 112 to equipment or structure to house and support the mount 112. While two mounting holes 114 are shown, this is for illustrative purposes only and should not be deemed limiting. There can be a single mounting hole 114, or there can be a plurality of mounting holes 114. Further, while the mounting holes 114 are shown as being located in the outer periphery of the void 111, this is for illustrative purposes and should not be deemed limiting. Virtually any device can be used to couple the mount 112 to equipment or a structure, including but not limited to, bolts, screws, wiring, etc.

As shown the mount has a vertical component 116 and a horizontal component 113. In one embodiment the horizontal component 113 is approximately perpendicular to the vertical component 116. In one embodiment the vertical component 126 and the horizontal component 113 are integrally made as a single unit, whereas in other embodiments they comprise separate and distinct components which are coupled together.

As shown the horizontal component 113 has slots 117 which allow the coupler 112 to couple to a switch 119 (shown in FIG. 7). As depicted the horizontal component 113 has elongated slots 117 to allow for adjustments and optimal placing of the pneumatic switch/valve 119 to the slots.

As shown the vertical component 126 has a circular void 111. It has a curved top. This is for illustrative purposes and should not be deemed limiting. As an example, while the void 111 is depicted as circular, in other embodiments the void 111 can comprise a square, triangular, or other polygonal shape.

The horizontal portion 113, as depicted, extends out and approximately perpendicular to the vertical portion 126, as shown. In the embodiment depicted, there are two fins which extend out from the vertical portion 126. The fins create an internal cavity in which the switch 119 can be inserted and coupled. The fins also have coupling slots 117 which provide a location for the switch 119 to couple to the fins of the horizontal portion 113. In other embodiments, however, the mount 112 will not have external fins. Regardless of the configuration, the mount 112 provides a location for which to couple to equipment and to a switch/valve 119.

The size and shape of the mount 112 can vary depending upon the location to be mounted as well as the size, shape, and type of the switch 119. In FIG. 7, the switch 119 is shown as being located within and coupled to the mount 112. In this embodiment the switch 119 comprises a switch lever 127 which extends to and fits within the void 111. The void 111 defines the outer boundary through which the switch lever 127 can move. In other embodiments, as shown below, however, the switch lever 127 does not extend into the void 111. Instead, other components will extend through the void 111 and interact with the switch lever 127.

The mount 112 can comprise virtually any material. It can comprise plastic, rubber, metal, and combinations thereof. The mount 112 can be manufactured via any method known in the art including 3D printing, molding, casting, etc.

As noted, the mount 112 provides a novel opportunity to house and secure a switch 119. In one embodiment, the switch 119 is a three-way switch which allows selection of the location of the vented gas.

The mount 112 allows for conversion of an off-the-shelf pneumatic valve to be converted and utilized as a low bleed system. A high bleed system can be converted to a low bleed system by utilization of the mount 112.

In one embodiment the mount 112 utilizes a switch 119 which is in fluid communication with a SPARC system as described above. In such embodiments, the emissions are reduced to zero as the system utilizes air as opposed to wet gas.

Figure 8A:
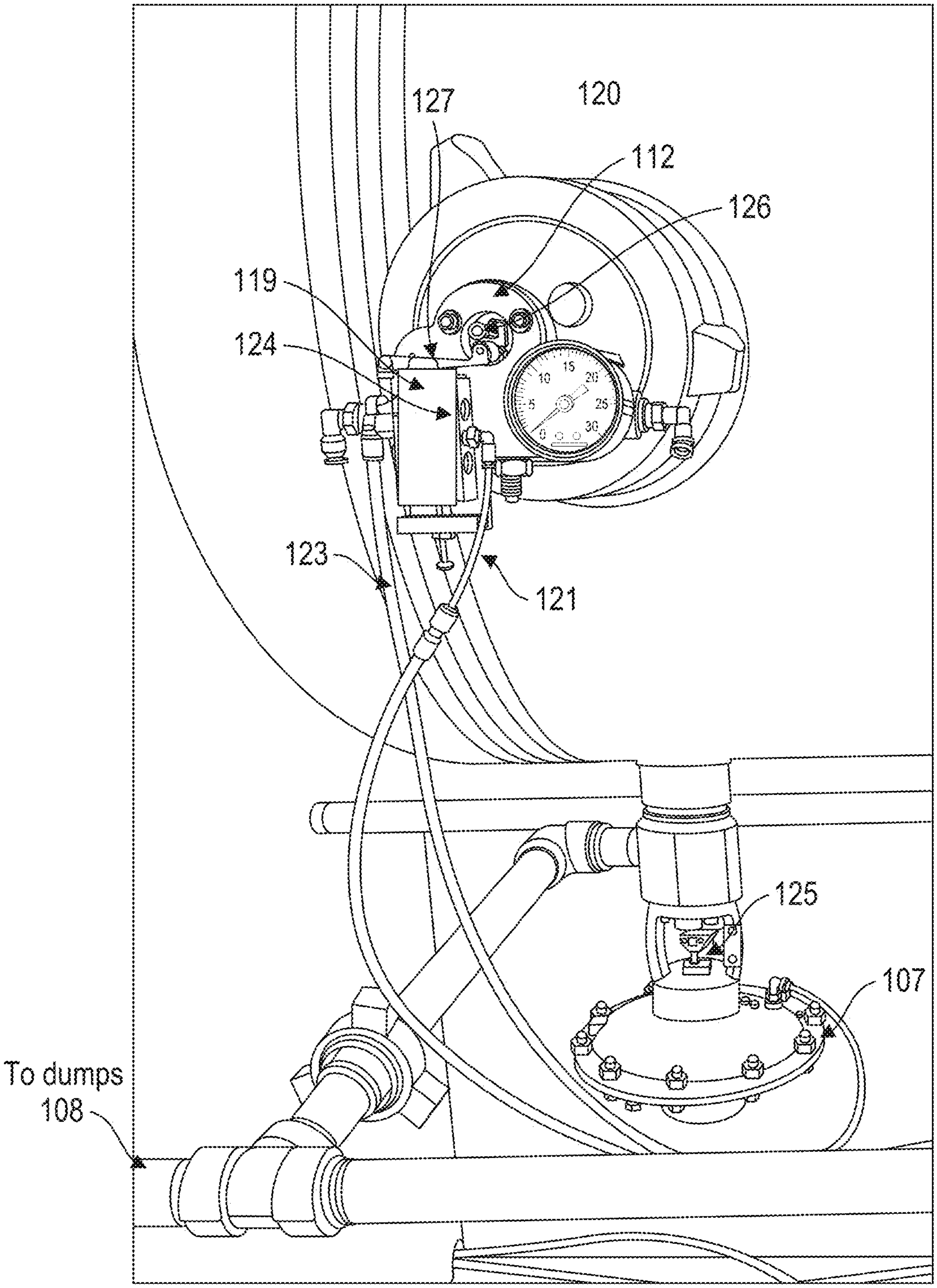
FIG. 8A is a perspective view of the mount and switch in one embodiment.
Figure 8B:
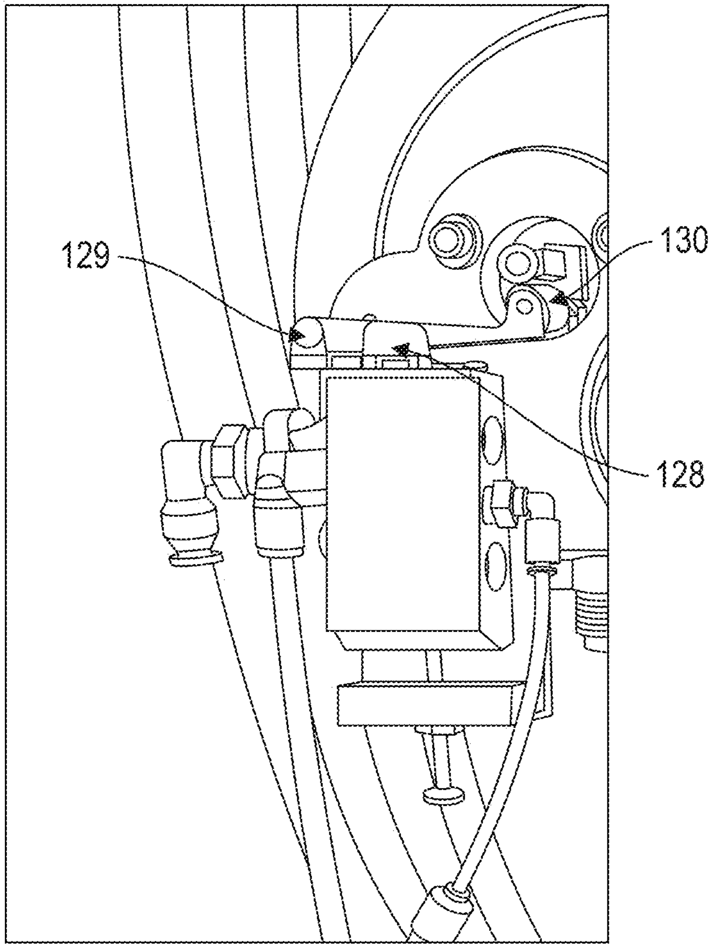
FIG. 8B is an enlarged perspective view of portions of FIG. 8A.

Turning to FIG. 8A, and FIG. 8B, FIG. 8A is a perspective view of the mount and switch in one embodiment. FIG. 8B is an enlarged perspective view of portions of FIG. 8A. FIG. 8A shows the vessel 120. As noted, this can comprise any vessel 120. As depicted, this vessel collects water and oil, each of which must be occasionally dumped to reduce a fluid level.

In one embodiment, the vessel 120 comprises a float which compares the desired fluid level to the actual floating level. If the actual floating level is greater than the desired float level, then the vessel 120 needs to be partially dumped to lower the fluid level. This can be accomplished via various methods known in the art. One such method involves a ball float which is coupled to a vessel float lever. The vessel float lever 126 extends outward from the vessel 120. If the fluid level is too high, the end of the vessel float lever 126 applies a downward force. This downward force is felt by the switch lever 127. In one embodiment the switch lever 127 comprises a contact 130. The contact 130 is the point of the switch lever 127 which receives contact from the vessel float lever 126. The contact 130 can comprise virtually any material, including but not limited to, plastic, rubber, metal, and combinations thereof.

When a downward force is applied at one end of the switch lever 127, the switch lever 127 pivots via the lever pivot 129. Thus, a downward force upon the switch lever 127 forces the switch lever 127 downward.

As shown, and in one embodiment, the pneumatic switch 119 has a switch peg 128. The switch peg 128 extends beyond the body of the pneumatic switch 119. In one embodiment, the position of the switch peg 128 determines which output is aligned with the input. In one embodiment the switch peg 128 comprises a biasing mechanism which forces the switch peg 128 into an extended position. The biasing mechanism can comprise a spring, for example. When the switch peg 128 is pressed downward, this overcomes the biasing of the biasing mechanism, and changes the configuration of the switch. As noted, in one embodiment, the switch 119 is in a closed position when the switch peg 128 is in the extended position. However, when pressed downward, the pneumatic supply line 121 is coupled to the pneumatic supply out line 123. The pneumatic supply out line 123, which was previously not pressurized, becomes pressurized as the switch 119 is opened.

As can be seen, the switch peg 128, and its interaction with the switch lever 127 can change the configuration of the switch 119. As shown, the vessel float lever 126 extends through the void 111 in the mount 112. It can then engage with the switch lever 127.

When the switch peg 128 is pressed downward, and the switch 119 allows flow through the switch 119 and into the pneumatic supply out 123, pressure is then applied to the dump control 107. As noted above, in some embodiments the dump control 107 has a biasing mechanism such as a spring, for example, which forces the dump control 107 to remain in the closed position until pressure overcomes the biasing mechanism. When the pneumatic supply out 123 overcomes the biasing mechanism, the dump valve 125 moves from closed to open. When this occurs, fluid from the vessel 120 is allowed to flow through the valve 125 and in the shown line. As demonstrated, the line is in fluid communication with the dumps 108. The dumps 108 can comprise another holding tank, for example.

In one embodiment, the switch 119 keeps the dump control 107 in an open position to partially dump the vessel 120 until the desired level within the vessel 120 has been obtained. When this occurs, the vessel float lever 126 will no longer apply a downward force upon the switch lever 127, and accordingly the switch peg 128. The biasing mechanism will then force the switch peg 128 into the extended position. This cuts off flow from the pneumatic supply 121 and the pneumatic supply out 123. The dump control 107 is no longer under pressure, and the dump valve 125 which controls fluid flow out of the vessel 120 in this location shuts off, stopping fluid flow to the dumps 108.

In one embodiment, with the switch peg 128 in the extended position, the pneumatic supply out 123 is coupled to the pneumatic discharge 124. In one embodiment the pneumatic discharge 124 is open to the atmosphere. Thus, when the switch peg 128 returns to the extended position, due to the biasing mechanism, pressure is relieved from the pneumatic supply out 123.

In one embodiment the pneumatic discharge 124 further comprises a three-way valve which can direct the discharged gas either to the atmosphere, or to a flare, incinerator, etc.

As can be seen, the mount 112 and the switch 119 can convert a constant bleed system to a low, intermittent bleed, system. As shown previously, this can reduce emissions and waste by 90%. This turns a waste stream into a stream which can be used or sold.

Without the mount 112 and switch 119 described herein, a previously continuous, high-bleed system, allowed a constant bleeding of the pneumatic line. However, with the low bleed approach the emissions and loss are substantially decreased, as shown above. Further, this can be accomplished at a much lower capital cost than traditional mizers. Thus, the system and method discussed herein has significant and profitability benefits.

While the invention has been particularly shown and described with reference to a preferred embodiment, it will be understood by those skilled in the art that various changes in form and detail may be made therein without departing from the spirit and scope of the invention.

What is claimed is:

1. A system for controlling level in a vessel, said system comprising:

a vessel comprising a vessel float lever;

a pneumatic switch comprising a switch peg extending toward and contacting a switch lever, wherein said switch peg extends beyond the body of said pneumatic switch, and wherein said switch peg comprises a biasing mechanism which forces the switch peg into an extended position;

wherein said vessel float lever applies a force upon said switch lever depending upon a level of fluid in said vessel;

a mount for coupling said pneumatic switch to said vessel;

a pneumatic supply line into said pneumatic switch, and a pneumatic supply out line from said pneumatic switch, and a pneumatic discharge line fluidly coupled to said pneumatic switch, and wherein said pneumatic switch has at least an open position and a closed position, and wherein a location of said switch peg determines whether the pneumatic switch is in the open position or the closed position, wherein with said switch peg in the extended position, said pneumatic supply out line is coupled to said pneumatic discharge line, and wherein, with said switch peg pressed downward, said pneumatic supply line is coupled to said pneumatic supply out line;

wherein said pneumatic supply comprises pressurized gas from said vessel;

wherein said pneumatic switch is fluidly coupled to a dump control which controls fluid level within said vessel;

and wherein with said pneumatic supply line coupled to said pneumatic supply out line, said pneumatic switch engages said dump control, fluid is discharged from said vessel;

wherein, while said vessel float lever applies said force upon said switch lever, said pneumatic switch keeps said dump control in an open position until desired level within vessel has been obtained whereby vessel float lever no longer applies downward force on said switch lever.

2. The system of claim 1 further comprising a dump control in fluid communication with said pneumatic switch, and wherein when a force is applied to said switch lever, said pneumatic switch directs pressurized gas to said dump control which begins draining fluid from said vessel.

3. The system of claim 1 wherein said pneumatic supply comprises air.

4. The system of claim 1 wherein said switch lever further comprises a lever pivot about which said switch lever pivots.

5. The system of claim 1 wherein said pneumatic discharge line is open to the atmosphere.

6. The system of claim 1 wherein said mount is 3D printed.

* * * * *